United States Patent Office 3,245,926
Patented Apr. 12, 1966

3,245,926
HALOGEN-CONTAINING RESIN STABILIZED WITH PENTAERYTHRITOL PHOSPHITES
Emery Parker, New York, N.Y., assignor to Carlisle Chemical Works, Inc., Reading, Ohio
No Drawing. Filed Sept. 4, 1956, Ser. No. 607,560
9 Claims. (Cl. 260—23)

This invention relates to halogen-containing stabilized resins, more specifically to stabilized resins containing vinyl chloride units.

As the invention is particularly useful in connection with vinyl chloride polymers and copolymers, it will be described in connection with such compositions. It is, however, to be understood that the invention is not limited to such compositions but applies equally to other resin compositions containing halogen; it may also be used in the manufacture of fibers from halogen-containing resins, for instance for fibers made of, or containing, polyvinylidene chloride.

It is known that certain organic esters of phosphorous acid are stabilizers for halogen-containing resins, particularly when they are used in combination with other stabilizers, such as metallic soaps, epoxy compounds, organotin compounds, or mixtures thereof.

It is also known that the conventional alkyl and aryl phosphites have certain drawbacks, which are set forth in detail in the copending application, Ser. No. 403,054, filed by the inventor jointly with Gerry P. Mack on June 8, 1954, now abandoned. In said application, a number of organic derivatives of trivalent phosphorous have been disclosed and claimed, which avoid the drawback of the trialkyl and triaryl phosphites.

I have now found that trivalent phosphorous derivatives of polyhydric alcohols having more than three hydroxyl groups, and particularly those of pentaerythritol perform in an unexpectedly superior way. Their stabilizing effect alone, or in synergistic combination with other stabilizers, particularly metallic soaps, is much higher than that of the above-mentioned simple esters of phosphorous acid, and they accomplish this effect at much lower concentration levels. Their better effectiveness is due not only to their high phosphorous content, but it apparently also depends on their high boiling point and perhaps other properties too. These derivatives are represented by the general formula:

(1) $\quad Y(OH_2C)_2C(CH_2O)_2Y^1$ wherein Y and Y$^1$ represent the groups POR and $(P(OR)_2)_2$ R may be any saturated or unsaturated aliphatic, aromatic or alicyclic radical, such as methyl, ethyl, propyl, isopropyl, butyl, amyl, hexyl, octyl, dodecyl, octadecyl, vinyl, allyl, methallyl, octenyl, undecenyl, octadecenyl, ricinoleyl, phenyl, tolyl, xenyl, cumyl, p. tert. butyl phenyl, p. octyl phenyl, p. nonyl phenyl, cyclopropyl, cyclobutyl, furyl, cyclohexyl, abietyl, and others.

The compounds may be prepared, for instance, by reacting an organic phosphite of the formula $P(OR)_3$, wherein R has the same composition as recited above, with pentaerythritol at elevated temperatures sufficient to distill off the alcohol ROH formed during the reaction.

According to the molecular ratios of the reactants employed, various well defined compounds corresponding to the formula (1) may be obtained. When 1 mole of pentaerythritol is reacted with two moles of a phosphite $P(OR)_3$ according to the equation (2) $\quad C_5H_{12}O_4 + 2P(OR)_3 \rightarrow C_5H_8O_6P_2R_2 + 4ROH$ the reaction product has the structural formula (1a) 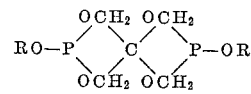

If instead of two moles of phosphite, 4 moles are reacted with one mole of pentaerythritol, according to the equation (3) $\quad C_5H_{12}O_4 + 4P(OR)_3 \rightarrow C_5H_8O_{12}P_4R_8 + 4ROH$ the obtained compound has the structural formula (1b) 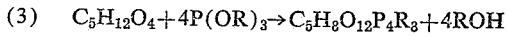

By reacting one mole of pentaerythritol with 3 moles of $P(OR)_3$, the compound (1c) 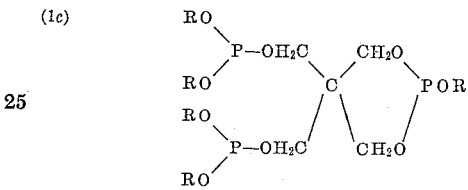

is obtained. The same Compound 1c can be prepared by heating equimolar amounts of the Compounds 1a and 1b.

The pentaerythrityl phosphites can be used in a wide range of proportions, for example from 0.1 to 10 percent by weight of the halogen-containing resin. If they are used in synergistic combination with other stabilizers, proportions of 0.1 to 0.4 percent by weight of the halogen-containing resin are generally sufficient, whereby the amount of said other stabilizer may be 0.5 to 5 percent, preferably 1 to 3 percent, calculated on the amount of the resin. Stabilizers suitable to be employed in conjunction with the pentaerythrityl phosphites are particularly metallic soaps and/or chelate compounds, alone or in combination with other stabilizers. As metallic soaps, I may use salts of the alkaline earth metals, magnesium, cadmium, zinc, di- and tetravalent tin, with fatty acids, containing from 6 to 18 carbon atoms, for instance hexoic acids, 2-ethylhexoic acid, iso octoic, capric acid, caprylic acid, caproic acid, iso decanoic, lauric acid, myristic acid, oleic acid, stearic acid, ricinoleic acid and others. Also mixtures of these salts, or double salts, for instance barium-cadmium or calcium-zinc salts, may be used. The phosphite stabilizers are also useful in combination with any kind of the widely used lead stabilizers, where they greatly reduce the opacity normally present in such lead stabilized resin articles on vinyl chloride basis. Such lead stabilizers are inorganic or organic lead salts, e.g., the basic carbonate, salicylate, maleate, 2-ethyl hexoate, phosphite, basic silicate, basic phthalate, basic maleate, the stearate, ricinoleate, and the like.

Suitable chelates are for instance alkaline earth metal chelates of ethyl acetoacetates, diketones, and similar compounds.

Instead of, or in addition to, the recited stabilizers, the resins may contain epoxy compounds containing the

group which are known to enhance the stabilizing properties of phosphite stabilizers.

Such compounds are, for instance, condensation products of epichlorohydrin and polyhydric phenols, such as diphenylol propane, in various ratios; glycidyl ether of phenols and substituted phenols; glycidyl esters of fatty acids; sulfonamide-epichlorohydrine condensation products; epoxidated fatty acid esters of monohydric, dihydric and polyhydric alcohols.

The suitable amounts of such epoxy compounds will vary and depend, among others, on the oxiran oxygen content of the epoxide and on the compatibility of the compound with the resin and plasticizer. Generally, amounts of about 0.5 to 5 percent by weight of the resin will be used; however, if the epoxy compound is a good plasticizer for the resin, its addition may be increased so far as to replace part or even the total amount of the plasticizer.

The novel auxiliary stabilizers may be used for all types of halogen-containing resins for which the recited primary metal salt stabilizers are normally employed, and they increase the heat and light stability of such resins while reducing the cloudiness sometimes imparted by said metal salts. An illustrative list of such resins is, for instance, given in the Patent No. 2,592,926.

In the following, I give first an example illustrating the preparation and physical properties of pentaerythrityl phosphites, and subsequently examples illustrating the stabilizing effect of said phosphites in comparison with other organic phosphites. It is to be understood that these examples are not to be considered as limiting the scope of the invention, which is defined by the appended claims. Specific primary and auxiliary stabilizers given in the examples, may be replaced by other compounds belonging to the groups recited above, and a stabilizer used for a particular resin may be used with similar effect for other halogen-containing resins. All parts are given by weight, unless specified otherwise.

*Example 1*

310 g. of triphenyl phosphite and 34 g. of pentaerythrityl are heated using good mixing under a blanket of nitrogen gas at 175–185° C. until the distillation of phenol starts, then the introduction of nitrogen is discontinued and vacuum is slowly applied (up to about 27–28 inches) to facilitate the removal of the phenol. After the distillation of the phenol has stopped, the batch is cooled to room temperature.

The obtained liquid octaphenyl pentaerythrityl tetraphosphite (Formula 1b, R=$C_6H_5$) had the following characteristics P=12.3%; mol. w. 1000.8; $d_{25}$ 1,240; $n_D^{25}$ 1.5823.

If, instead of 34 g. of pentaerythritol, 68 g. were used, solid diphenyl pentaerythrityl diphosphite according to Formula (1a) was obtained. After recrystallization from warm hexane, the compound had a melting point of 102–105° C. P=16.2%; mol. w. 380.2.

The compound obtained by reacting 51 g. of pentaerythrityl with 310 g. of triphenyl phosphite (Formula 1c) had a melting point of 65° C.; P content=13.4% mol. w. 693.

*Example 2*

500 parts of a vinyl chloride-acetate co-polymer resin consisting of 95% of vinyl chloride and 5% of vinyl acetate, and 250 parts of dioctyl phthalate were blended together with 10 parts of a co-precipitated barium cadmium laurate salt containing 16% of barium and 8% of cadmium. After thorough mixing, the master batch was divided into five batches containing 152 parts each.

To these five batches, the following phosphite stabilizers were added, respectively:

(1) 0.5 part of triocetyl phosphite
(2) 0.5 part of triphenyl phosphite
(3) 0.5 part of octyl diphenyl phosphite
(4) 0.4 part of octaphenyl pentaerythrityl tetraphosphite
(5) 0.3 part of diphenyl pentaerythrityl diphosphite.

The five batches were each milled separately on a two-roll mill for 5 minutes at 320° F. until uniformly fluxed sheets were obtained. The sheets were then pressed under 10,000 p.s.i. at 320° F. for another 10 minutes in a 6" x 6", 40 mil depth mold cavity. All five films thus obtained were clear and completely colorless after the milling and pressing cycles. Each film was then cut into 9 square pieces of 2" x 2" dimensions. Eight such pieces from each of the formulations were then placed in an air circulating oven and heat tested for a two hour period at 350° F. removing one sample of each formulation at 15 minute intervals and noticing the discoloration. Films #1 and #2 discolored after 60 minutes' exposure, film #3 withstood 75 minutes before discoloration, and films #4 and #5 were not discolored after 120 minutes of heating.

*Example 3*

Two batches, each consisting of 100 parts of polyvinyl chloride "easy processing" grade resin, 1.5 parts of cadmium stearate, and 0.5 part of barium laurate were prepared and mixed thoroughly. To the first batch, 0.5 part of triphenyl phosphite were added, while to the second batch, 0.3 part of diphenyl pentaerythrityl diphosphite were added. The two batches were then each milled and press polished as described in Example 2, yielding 6" x 6" sheets of completely colorless clear rigid plastic. The rigid sheets were then cut into 2" x 2" sheets and oven heat tested at 350° F. for two hours, removing samples of each formulation at 15 minute intervals. Film #1 became noticeably yellow after 15 minutes of oven heat testing and turned black after 45 minutes. Film #2 became yellow only after 60 minutes and did not turn black until 105 minutes of heat testing.

*Example 4*

A plastisol master batch was prepared by mixing 300 parts of dispersion grade PVC resin, 195 parts of dioctyl phthalate, 15 parts of epoxidized soyabean oil, and 9 parts of a liquid barium cadmium 2-ethylhexoate (in plasticizer carrier) containing 7% of barium and 4% of cadmium. This master batch, after thorough mixing and grinding, was divided into three equal portions of 173 parts each. 0.5 part of triphenyl phosphite were added to the first portion, 0.4 part of octaphenyl pentaerythrityl tetraphosphite were added to the second, and 0.3 part of diphenyl pentaerythrityl diphosphite were added to the third portion. After additional mixing and vacuum de-aeration of the liquid plastiols, films from each of the three batches were cast on large glass plates and fused in an air circulating oven for 5 minutes at 360° F. After fusing, the films were obtained as soft, clear, colorless flexible sheets. These sheets were then cut into individual 2 inch squares and samples of each formulation were further heat tested at 360° F., removing samples at 10 minutes intervals. Sample #1 showed initial yellow discoloration after a total of 30 minutes and was dark brown after 40 minutes. Samples #2 and #3 were both clear after 40 minutes and first began to discolor after 50 minutes' oven exposure at 360° F.

*Example 5*

200 parts of a polyvinyl chloride resin, 90 parts of dioctyl phthalate, 10 parts of butyl epoxy stearate, and 4 parts of a co-precipitated barium-strontium-zinc laurate (containing 8% barium, 8% strontium and 5% zinc) were mixed together thoroughly. This master batch was then divided into two equal batches each containing 152 parts. 0.5 part trioctyl phosphite was added to sample #1, while 0.4 part of octaphenyl pentaerythrityl tetraphosphite was added to sample #2. The two batches were then each milled separately and continuously on a 2-roll mill at a roll temperature of 340–345° F. and samples were removed from the milled resin every 10 minutes. These samples were press polished to specimens of uniform thickness. Discoloration in the form of yellowing started in the first resin mix after 60 minutes' milling, and after 90 minutes, milling had to be discontinued because of complete breakdown. The sample #2 was milled for 90 minutes when discoloration set in and after 120 minutes the batch was still only orange yellow when milling was discontinued.

*Example 6*

200 grams of a vinylidene chloride-acrylonitrile copolymer (95:5) resin and 100 grams of dioctyl phthalate were dissolved in 700 grams of a mixture consisting of methyl ethyl ketone and cyclohexanone 4 to 1. To 500 grams of this resin solution was added: two grams of cadmium 2-ethyl hexoate dissolved in dioctyl phthalate (cadmium metal content 14%) and one gram of triphenyl phosphite. To another 500 grams were added 2 grams of cadmium 2 ethyl hexoate solution in dioctyl phthalate and one gram of diphenyl pentaerythrityl diphosphite.

From these two clear resin solutions, films were cast on glassine paper in a thickness of one mil. The solvent is evaporated at room temperature and after the films are dry, they are stripped from the paper and aged for 24 hours to completely eliminate the solvent. The resulting films are optically clear. Two by two square inches of this film were then exposed to ultra-violet light in the Atlas fadometer until discoloration is noticeable.

Film #2 containing the novel phosphite did not discolor after 500 hours' exposure while film #1 showed discoloration after 400 hours. When the two films were exposed to heat in an air circulating oven at 350° F., film #2 had a higher resistance to brown discoloration than film #1 containing the triphenyl phosphite.

From the same solution fibers are extruded through a spinneret in hot air and stretched in the usual manner. The resulting fibers have an outstanding resistance to discoloration when exposed to sunlight and ultra-violet radiation. The whiteness of the fibers is also much improved over similar fibers not containing the stabilizer system.

*Example 7*

125 grams of a chlorinated rubber and 125 grams of chlorinated paraffin are dissolved in 340 grams of a mixture of toluol and mineral spirit. To this solution are added 100 grams of titanium dioxide and 140 grams of calcium carbonate. The entire mix is milled in a three roll paint mill until a uniform free flowing product is obtained.

To 200 grams of the thus obtained lacquer are added 2½ grams of an epoxidated soy bean oil and .5 gram of a triphenyl phosphite; to another 200 grams of the same lacquer are added 2.5 grams of an epoxidated soy bean oil and .5 gram of octyl phenyl pentaerythrityl diphosphite. Both solutions are then applied on steel panels, air dried, baked at 300° F. for 10 minutes and then the panels exposed in an Atlas fadometer. The film containing the octa phenyl pentaerythrityl diphosphite is not discolored after 1,000 hours of exposure, while the film containing the triphenyl phosphite is discolored after 600 hours.

I claim:
1. A heat resistant composition containing as a major constituent a vinyl chloride resin, and a stabilizer therefor, about 0.1 to 10 percent by weight of the resin of a pentaerythritol phosphite.
2. A heat resistant resin composition containing as a major constituent a vinyl chloride resin, and as a stabilizer a pentaerythrityl phosphite of the formula

$$Y(OH_2C)_2C(CH_2O)_2 Y^1$$

wherein Y and $Y^1$ are members of the group consisting of POR and $(P(OR)_2)_2$, R being a monovalent hydrocarbon radical, said phosphite being present in an amount of about 0.1 to 10 percent by weight of said resin.
3. A heat resistant vinyl chloride resin containing as stabilizer about 0.1 to 5 percent of a member of the group consisting of octaphenyl pentaerythrityl tetraphosphite and diphenyl pentaerythrityl diphosphite.
4. A heat resistant vinyl chloride resin composition containing as a solid stabilizer diphenyl pentaerythrityl diphosphite in an amount of about 0.1 to 10 percent by weight of said resin.
5. A heat resistant resin composition comprising a member of the group consisting of vinyl halide resins, vinylidene halide resins, and halogenated rubber, and as a stabilizer an organic phosphite ester of pentaerythritol in an amount of about 0.1 to 10 percent by weight of said resin.
6. A heat resistant composition comprising a vinyl chloride polymer and a stabilizing amount of barium-cadmium laurate and a pentaerythritol phosphite.
7. A composition as defined in claim 2 containing as additional stabilizer a metal salt of an aliphatic acid containing 6 to 18 C atoms.
8. A composition as defined in claim 2, containing additionally an epoxy stabilizer.
9. A composition as defined in claim 8 containing in addition about 0.5 to 5 percent of a metal soap stabilizer selected from the group consisting of barium and cadmium salts of aliphatic acids containing 6 to 18 C atoms.

References Cited by the Examiner

UNITED STATES PATENTS

| | | | |
|---|---|---|---|
| 2,437,046 | 3/1948 | Rothrock et al. | 260—45.7 |
| 2,437,232 | 3/1948 | Rothrock et al. | 260—45.7 |
| 2,456,216 | 12/1948 | Richter | 260—45.7 |
| 2,711,401 | 6/1955 | Lally | 260—45.7 |
| 2,734,881 | 2/1956 | Lally et al. | 260—45.95 |
| 2,847,443 | 8/1958 | Heckenbleikner et al. | 260—45.7 |

FOREIGN PATENTS 1,119,752  4/1956  France.

LEON J. BERCOVITZ, *Primary Examiner.*

MILTON STERMAN, A. M. BOETTCHER,
   A. D. SULLIVAN, *Examiners.*